United States Patent [19]

Hoyt, Jr.

[11] Patent Number: 4,470,411

[45] Date of Patent: Sep. 11, 1984

[54] PROTECTIVE BOOT FOR LEG OF HORSE

[75] Inventor: Dolph G. Hoyt, Jr., Los Angeles, Calif.

[73] Assignee: Principle Plastics, Gardena, Calif.

[21] Appl. No.: 467,995

[22] Filed: Feb. 18, 1983

[51] Int. Cl.³ ............................................. A61F 13/00
[52] U.S. Cl. ....................................... 128/165; 54/82
[58] Field of Search ................... 128/165, 132 R, 156, 128/157, 87, 82; 54/82

[56] References Cited

U.S. PATENT DOCUMENTS 3,405,506 10/1968 Kostur ..................................... 54/82
4,140,116 2/1979 Hampicke ........................... 128/165

Primary Examiner—John D. Yasko
Attorney, Agent, or Firm—Whann & McManigal

[57] ABSTRACT

A protective boot which can be removably attached to the legs of horses, that may be engaged in a variety of activities such as galloping, jumping and the like, in a position extending over the shank and contiguous fetlock joint areas, and which comprise a body portion formed of an outer layer of flexible synthetic plastic sheet material and an inner cushion layer of foamed synthetic plastic material having their confronting surfaces bonded together, the inner layer also being formed to provide a plurality of ribs separated by open-sided grooves extending longitudinally of the body and lengthwise of the horse's leg. Through-going perforations in the grooves and ridges permit evaporation of sweat. Attaching bands or straps are integrally formed with the outer layer of plastic sheet material for engagement by clamping devices, and in which these bands have strengthening fabric inserts and transverse laterally spaced apart ridges to prevent slippage in the clamping device. The holding bands and coacting clamping devices at the fetlock joint area are in converging relation with respect to parallel bands and clamping devices in other areas.

8 Claims, 6 Drawing Figures

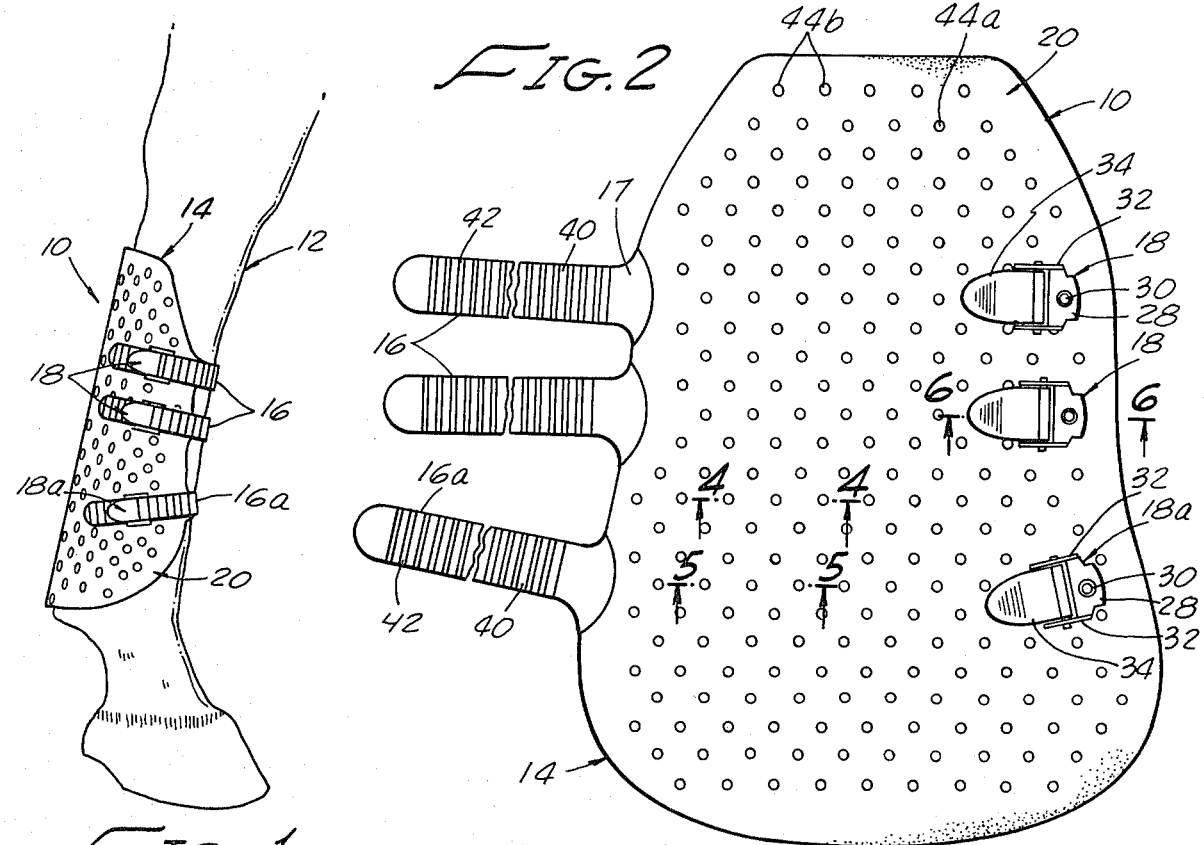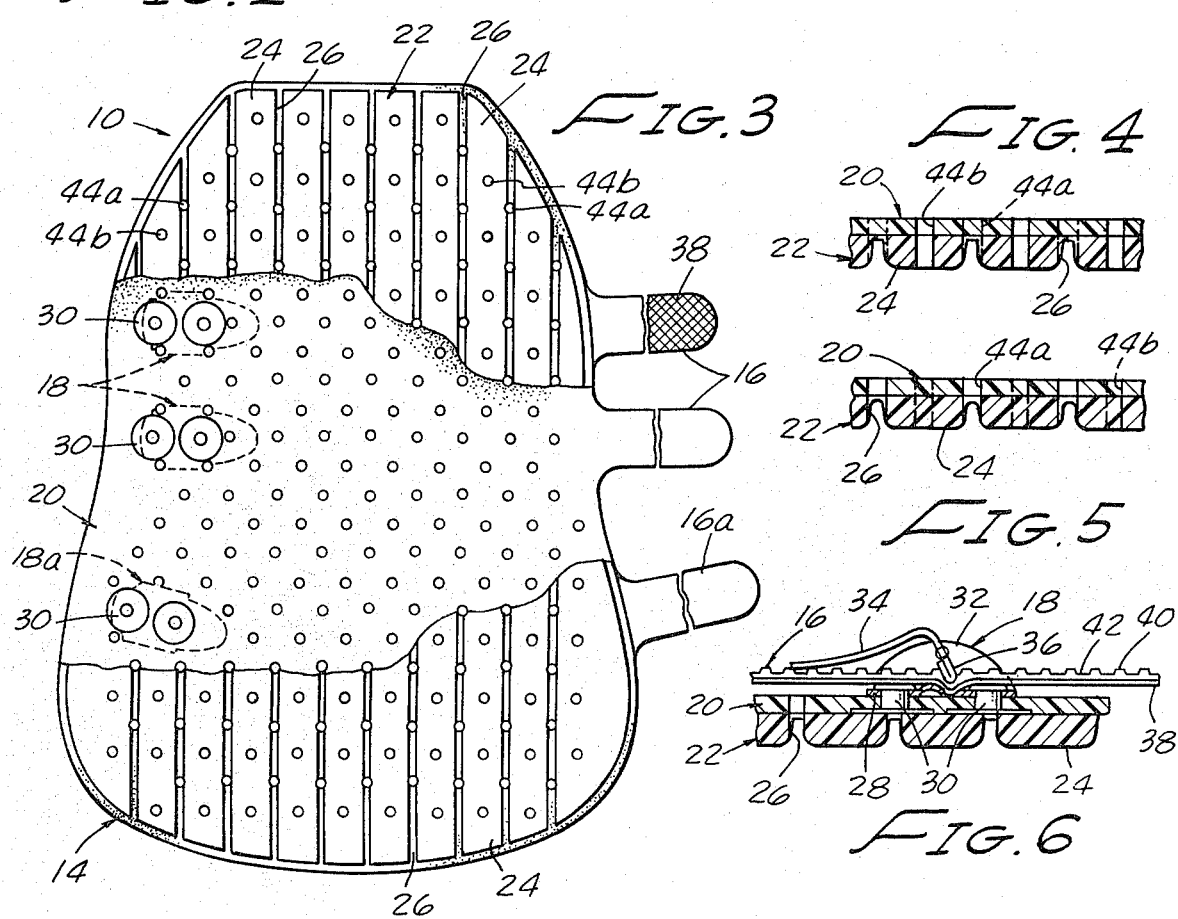

PROTECTIVE BOOT FOR LEG OF HORSE

PRIOR ART

In the prior art there are a number of devices or boots which are arranged for removable attachment to portions of a horse's leg for use in treatment with medication and to afford protection against externally applied impact forces. The closest art known to applicant are the following patents:

U.S. Pat. No. 1,479,000—Jan. 1, 1924
U.S. Pat. No. 3,405,506—Oct. 15, 1968
U.S. Pat. No. 3,717,145—Feb. 20, 1973
U.S. Pat. No. 4,140,116—Feb. 20, 1979

BACKGROUND OF THE INVENTION

The present invention relates generally to a protective device or boot for removable attachment to the leg of a horse.

Having reference to the prior art patents noted above, these prior art patents disclose that it has been generally known to provide a protective device or boot structure which may be applied to the leg of a horse as a bandage to afford treatment of a leg portion with medication, and for the protection of a leg portion against damage by externally applied impact forces while the horse is participating in a rigorous activity such as jumping, galloping and the like.

Such devices or boot have commonly been fabricated to provide a structure as previously known in U.S. Pat. No. 4,140,116 in which the bandage or boot is comprised of a flexible outside backing layer of a plastic sheet material, and an inner layer of foamed-plastic material which forms a cushion that is peripherally secured to the outer layer. The inner layer is in the form of a mat having passage-forming grooves opposed on opposite sides of the mat with regularly distributed perforations opening through the grooves to enable sweat to pass directly along the animal's leg and also after passage through the perforations between the inner and outer layer and exit at the margin of the bandage. This patent also discloses the use of fastening bands or straps which are integrally formed with the material of the outer layer.

U.S. Pat. No. 3,405,506 also discloses a protective device or boot which embodies an outer plastic shell which is bonded to a compressible inner lining, and the concept of a limited use of apertures which extend entirely through the outer plastic layer and the inner-cushioning layer to provide a passage from the outside environment to the surface of the horse's leg.

Applicant has found through extensive field tests and consideration of the presently available devices, that in the case of protective devices and boots for the legs of horses that are engaged in activities which require the expenditure of a relatively high degree of exercise and energy, the evaporation and disposal of the generated sweat in the area protected by the device or boot becomes an extremely serious problem, for the reason that its accumulation can cause injury due to burning in the boot area. In this respect, the structure as known from U.S. Pat. No. 4,140,116 has proved relatively ineffective for the reason that the sweat evaporation or removal path is extremely long and circuitous. In the case of the device disclosed in U.S. Pat. No. 3,405,506, the suggested apertures are relatively limited with respect to the entire area of boot engagement with the horse's leg. In the present invention, burning and damage to the horse's leg is obviated by providing throughgoing perforations which extend through the inner and outer layers throughout the entire area of contact between the boot and the horse's leg, and are so arranged that short, direct evaporation channels are established between the covered portions of the horse's leg and the surrounding external environment, and that burning due to sweat accumulation becomes substantially non-existent.

A further feature of applicant's invention resides in the arrangement and structure of the fastening bands or straps wherein their strength is increased by a fabric insert, and slippage is eliminated by providing transversely extending ridges which are longitudinally spaced of the band or strap. A clamping device is arranged to engage the strap between these ridges and thus eliminate the possibility of slipping and loosening of the holding device for the boot.

It has also been found that when the boot overlies the fetlock joint, parallel arranged bands will be angularly disposed in their attached position and that tension stresses will be unevenly distorted in the band in such a manner that there will be a tendency for the band to rupture at its edge portions. By initially positioning the bands in this area at an angle with respect to the parallel bands, the bands in the fetlock joint area will have their tension stress forces more uniformly distributed and thus decrease the possibility of breakage.

SUMMARY OF THE INVENTION

The present invention is more particularly concerned with an improved protective device or boot for the legs of horses engaged in relative strenuous activities, and which will overcome the inherent disadvantages of presently known and available devices for this purpose.

It is one object of the herein described invention to provide an improved protective boot which can be removably attached to the legs of horses engaged in a variety of activities such as galloping, jumping and the like, which will be securely held in attached position, and will protect the horse's leg against external impacts and also vent the sweat under the boot quickly and directly to the atmosphere and thus prevent injury from burning.

A further object is to provide a protective boot of the type described which is of simple construction and can be adjustably, securely attached in a comfortable applied position on the leg, and which will not slip or become loosened during engagement in a particular activity.

A still further object resides in the provision of a protective boot for a horse's leg, which is attached by securing plastic bands or straps and associated clamping buckles or devices, and wherein the bands were strengthened by an internal reinforcing medium and provided externally with surface ridges which prevent slippage in the clamping device.

Another object is to provide a device or boot according to the previous object, wherein the attaching bands and clamping devices in the applied shank area of the leg are in parallel relation, while the band or bands and their clamping devices in the fetlock joint area will be in angular relation to the parallel bands and clamping devices, whereby the tension forces in the band or bands in the fetlock joint area will be substantially, uniformly distributed transversely thereof.

Still another object is to provide a protective boot for the leg of a horse having a body portion composed of an outer backing layer and an inner cushion layer provided with a plurality of longitudinally extending ribs separated by open-sided grooves and in which throughgoing perforations have their ends respectively communicating with the outer surface of the cushion layer and the outer surface of the backing layer so as to provide short and effective passages for evaporation of the sweat under the boot to the external atmosphere surrounding the boot.

A still further object is to provide a boot according of the foregoing object in which the perforations are positioned in either the ridges or the grooves or both, of the cushion layer.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only;

FIG. 1 is a fragmentary side elevational view of a horse's leg, showing a boot according to the present invention applied over the shank and fetlock joint areas;

FIG. 2 is an enlarged plan view of the boot, laid out flat, looking at the exposed surface of the outer backing layer;

FIG. 3 is an enlarged plan view looking at the exposed surface of the inner cushion layer, with portions being cut away to disclose the underlying surface of the outer layer;

FIG. 4 is an enlarged fragmentary sectional view, taken substantially on line 4—4 of FIG. 2, to show the throughgoing perforations in the ribs of the cushion layer;

FIG. 5, is a similar fragmentary sectional view, taken substantially on line 5—5 of FIG. 2, to show details of the throughgoing perforations in the grooves of the cushion layer; and FIG. 6 is an enlarged fragmentary sectional view, taken substantially of line 6—6 of FIG. 2, to show the mounting details of the clamping device and its gripping relationship with the securing band.

DESCRIPTION OF A PREFERRED EMBODIMENT

Referring now specifically to the drawings, for illustrative purposes, a protective device or boot 10 according to the present invention is disclosed in FIG. 1 as being applied to the leg 12 of an animal, such as a horse, in a position around the shank and fetlock joint areas. As will be seen, the boot comprises a body 14 which in the disclosed embodiment is arranged to extend around the sides and back of the leg and leave the forward portion of the leg exposed. However, it will be apparent that the structure of the present invention may, if desired, be utilized in a full wrap type of boot. The boot is retained in its applied position by means of a plurality of parallel extending bands or strap members 16 in the shank area, and an angularly extending strap member 16a in the fetlock joint area. Each of the band members is releasably engageable by an associated clamping device, such as a buckle as generally indicated at 18.

As best shown in FIGS. 2 and 3, the body 14 basically comprises an outer backing layer 20 formed of a flexible synthetic plastic sheet material such as plasticized polyvinyl chloride, and an inner cushion layer 22 of plasticized polyvinyl chloride chemically blown foam or other suitable material which is fused or otherwise bonded to the confronting surface of the backing layer 20. This cushion layer is formed to provide a cushion surface having a plurality of parallel ridges 24 which are laterally spaced by open-sided grooves 26 which are adapted in the applied position of the boot to extend generally longitudinally of the horse's leg.

The bands or straps 16 and 16a are integrally fused or bonded, as indicated at 17, with the material of the outer backing layer 20 and extend from one edge margin of the body 14. The buckle clamping devices 18 and 18a are mounted appropriately at the opposite marginal edge of the body 14.

As best shown in FIG. 6, the buckle clamping devices 18 and 18a are similar in construction and comprise generally a U-shaped base element 28 which is secured to the outer backing layer 20 by means of rivets 30. The base element has integrally formed side lugs 32, which are arranged to pivotally support a finger operable lever clasp or clamping element 34 having a clamping arm 36 which is movable into clamped engagement with an associated band or strap 16 or 16a, inserted between the side lugs 32.

A feature of the fastening straps and associated clamping buckles orientation resides in the mounting of the strap 16a and the clamping buckle 18a, which are in the fetlock joint area, in a converging angular orientation with respect to the parallel arranged straps 16 and buckles 18 in the shank area. This angular orientation compensates for the bulging effect of the body 14 due to the enlarged portion which comprises the fetlock joint. If the strap or straps in this area and the associated buckle or buckles were in parallel orientation with respect to the straps and buckles in the shank area, the tension stresses in the strap would be non-uniform and applied at the strap edges in a manner which would tend to fracture the straps. However, by initially orienting the straps and buckles in the fetlock joint area at one angle, these straps will be uniformly subjected to the tension stresses and less likely to fracture.

As previously mentioned, it is desirable that the straps or bands 16 and 16a should secure the attachment of the device or boot to the horse's leg without slippage or loosening, and at the same time enable small increments of adjustment. The straps or bands are therefore provided with an inner reinforcing fabric layer of material 38. which strengthens the strap and also prevents stretching. To assure non-slippage, each strap is provided with transversely extending surface ridges 40 which are laterally spaced apart longitudinally of the strap by grooves 42 which are adapted to receive the end of the clamping arm 36 therein and thus effectively hold the strap or band against slippage.

As previously pointed out, another feature of the present invention resides in the provision of means for venting the area of the horse's leg covered by the cushion layer 22 in a manner to quickly and directly enable the sweat at its point of orgin to be evaporated to the surrounding environment in order to prevent burning of the leg or other ensuing damage. This is accomplished in the present invention by the provision of multiple throughgoing perforations 44a in the grooves 26, and perforations 44b in the ridges 24 of the cushion layer 22.

From the foregoing description and drawings, it will be clearly evident that the delineated objects and features of the invention will be accomplished.

Variations and modifications may suggest themselves to those skilled in the art without departing from the spirit of my invention, hence, I do not wish to be restricted to the specific forms shown or uses mentioned, except to the extent indicated in the appended claims.

I claim:

1. A protective boot for application about the leg of a horse, comprising:
   a main elongate body portion;
   fastening means for releasably securing the body portion in desired position around a leg portion of the horse;
   said body portion having an outer flexible backing layer bonded to an inner cushion layer provided with a plurality of longitudinally extending ribs separated by open-sided grooves extending longitudinally of the body portion and substantially lengthwise of the leg when applied thereto, and
   said body portion being provided with throughgoing perforations in spaced relation, each having ends respectively communicating with the outer contact surfaces of the ribs of the cushion layer and the outer surface of the backing layer.

2. A boot according to claim 1, in which: said body portion includes other perforations in spaced relation, each having ends respectively communicating with the outer surface of the backing layer and the grooves separating said ribs.

3. A boot according to claim 1, in which:
   said inner layer is comprised of a foamed synthetic plastic material and said outer layer is comprised of a flexible synthetic plastic sheet material; and
   said fastening means includes spaced apart elongate securing bands integral with the outer layer material and extending from an edge thereof, and buckles secured along an opposite edge margin of the outer layer respectively having a clamping element for engaging said band, and said bands have transversely extending surface ridges in laterally spaced apart relation longitudinally of the band for opposing slippage between said clamping element and the clamped securing band.

4. A boot according to claim 3, in which:
   said bands are bonded to the outer layer material.

5. A boot according to claim 3, in which:
   said bands have a tensile strength greater than that of the outer layer material.

6. A boot according to claim 3, in which:
   said bands have a layer of longitudinally extending reinforcing material positioned between its opposite surfaces.

7. A boot according to claim 1, in which:
   said outer layer is comprised of flexible synthetic plastic sheet material; and
   said fastening means includes spaced apart elongate securing bands extending from one edge of said layer, and band fastening elements secured along an opposite edge margin of the outer layer for respectively engaging the securing bands and holding the boot in an applied position with the lower marginal portion of the boot extending around the fetlock joint of the leg and with the upper of said bands and associated fastening elements being in substantially parallel relation, and a lower band and associated fastening element being angularly disposed in relation to the upper bands and fastening elements to compensate for the angular displacement of the connected edges of the outer layer at the fetlock joint, and thereby uniformly stress the lower band along its opposite edges.

8. A boot according to claim 7, in which:
   the lower band and lower fastening device respectively extend in outwardly converging relation to said parallel upper bands and fastening devices.

* * * * *